United States Patent
Meron et al.

(10) Patent No.: US 11,468,129 B2
(45) Date of Patent: Oct. 11, 2022

(54) AUTOMATIC FALSE POSITIVE ESTIMATION FOR WEBSITE MATCHING

(71) Applicant: PayPal, Inc., San Jose, CA (US)

(72) Inventors: Avishay Meron, Tel Aviv (IL); Tomer Handelman, Tel Aviv (IL); Shay Elbaz, Tel Aviv (IL); Shuly Lev-Yehudi, Tel Aviv (IL)

(73) Assignee: PAYPAL, INC., San Jose, CA (US)

( * ) Notice: Subject to any disclaimer, the term of this patent is extended or adjusted under 35 U.S.C. 154(b) by 400 days.

(21) Appl. No.: 16/444,444

(22) Filed: Jun. 18, 2019

(65) Prior Publication Data

US 2020/0401633 A1    Dec. 24, 2020

(51) Int. Cl.
*G06F 16/951*   (2019.01)
*G06N 7/02*    (2006.01)
*G06F 16/958*   (2019.01)

(52) U.S. Cl.
CPC .......... *G06F 16/951* (2019.01); *G06F 16/958* (2019.01); *G06N 7/02* (2013.01)

(58) Field of Classification Search
CPC .. G06F 16/951; G06F 16/958; G06F 16/9535; G06F 16/24578; G06N 7/02
USPC ........................................ 707/709
See application file for complete search history.

(56) References Cited

U.S. PATENT DOCUMENTS

| | | | |
|---|---|---|---|
| 8,498,982 B1 * | 7/2013 | Cope | G06F 16/2457 707/722 |
| 9,367,872 B1 * | 6/2016 | Visbal | G06Q 40/02 |
| 2008/0256622 A1 * | 10/2008 | Neystadt | H04L 63/1433 726/14 |
| 2009/0089287 A1 * | 4/2009 | Roberts | G06F 16/9535 |
| 2009/0125529 A1 * | 5/2009 | Vydiswaran | G06F 16/951 |
| 2013/0138428 A1 * | 5/2013 | Chandramouli | G06F 40/40 704/9 |
| 2015/0066567 A1 * | 3/2015 | Shami | G06Q 10/06315 705/7.25 |
| 2015/0149491 A1 * | 5/2015 | Redlich | G06F 21/6218 707/755 |
| 2016/0283933 A1 * | 9/2016 | Orlando | G06Q 20/38215 |
| 2016/0373891 A1 * | 12/2016 | Ramer | H04W 4/02 |
| 2017/0140262 A1 * | 5/2017 | Wilson | G06Q 30/0282 |
| 2017/0163663 A1 * | 6/2017 | Gopalakrishnan | H04L 63/1483 |
| 2017/0286544 A1 * | 10/2017 | Hunt | H04L 63/0876 |
| 2018/0137135 A1 * | 5/2018 | Walton | G06F 16/958 |
| 2019/0007451 A1 * | 1/2019 | Pierce | H04L 63/1425 |
| 2019/0236273 A1 * | 8/2019 | Saxe | G06N 3/0454 |
| 2019/0236608 A1 * | 8/2019 | Formsma | G06Q 20/4016 |
| 2019/0259041 A1 * | 8/2019 | Jackson | G06F 16/288 |
| 2019/0266355 A1 * | 8/2019 | Lockhart, III | H04L 63/1433 |

\* cited by examiner

*Primary Examiner* — Hosain T Alam
*Assistant Examiner* — Nicholas E Allen
(74) *Attorney, Agent, or Firm* — Haynes and Boone, LLP

(57) ABSTRACT

A system and method for generating automatic false positive estimations for website matching is described. Several sets of assets and Uniform Resource Locators (URLs) are aggregated. Each of the several sets of assets is searched across webpage content corresponding to the several URLs to determine matches between the sets of assets and webpage content. One or more false positive estimations is determined, where each of the one or more false positive estimations corresponds to the one or more matches. A combined score is generated based on the one or more false positive estimations.

13 Claims, 4 Drawing Sheets

AUTOMATIC FALSE POSITIVE ESTIMATION FOR WEBSITE MATCHING

TECHNICAL FIELD

The subject technology generally relates to linking customers to websites and more particularly, relates to a system and method that provides false positive estimation for matching customers to websites.

BACKGROUND

Financial technology (FinTech) companies such as PayPal, Inc., continuously strive to gain a better understanding of its customers (i.e., merchant customers) to improve the experiences offered to the customers. By analyzing customers data, products can be tailored to better fit the customer's needs. The development of these products may be facilitated by a deeper understanding of customers' businesses and the domains in which they operate. Furthermore, having a deeper understanding of their customers allows FinTech companies to better manage risk.

There are many signals that may aid in understanding a merchant customer's business, including clients served by the merchant, the amount of transactions processed, and total payment volume (TPV). In addition, many merchants have online presences (e.g., websites) that provide detailed representations of the businesses. Accordingly, it is essential to verify merchant websites so that the information provided by these websites can be properly consumed and processed by the FinTech companies that engage them.

While there may be many sources that provide data usable for linking customers to websites (e.g., a merchant may specify its webpage during an onboarding process), such data may include a lot of noise. For example, merchants onboarding for an account with PayPal, Inc. will occasionally falsely declare www.paypal.com as their webpage, whether inadvertently or otherwise. As such, there needs to be a mechanism in place for evaluating the relation of a data pairs such as customer identification and a corresponding website/Uniform Resource Locator (URL). This evaluation will help determine with some degree of confidence whether a website a website belongs to a merchant customer and can be relied upon to provide the information needed to analyze the merchant customer.

SUMMARY

According to various aspects of the subject technology, a system for generating automatic false positive estimations for website matching is described. Several sets of assets and URLs are aggregated. Each of the several sets of assets is searched across webpage content corresponding to the several URLs to determine matches between the sets of assets and webpage content. One or more false positive estimations is determined, where each of the one or more false positive estimations corresponds to the one or more matches. A combined score is generated based on the one or more false positive estimations.

According to various aspects of the subject technology, a method for generating automatic false positive estimations for website matching is described. Several sets of assets and URLs are aggregated. Each of the several sets of assets is searched across webpage content corresponding to the several URLs to determine matches between the sets of assets and webpage content. One or more false positive estimations is determined, where each of the one or more false positive estimations corresponds to the one or more matches. A combined score is generated based on the one or more false positive estimations.

According to various aspects of the subject technology, a non-transitory machine-readable medium having stored thereon machine-readable instructions executable for generating automatic false positive estimations for website matching is described. Several sets of assets and URLs are aggregated. Each of the several sets of assets is searched across webpage content corresponding to the several URLs to determine matches between the sets of assets and webpage content. One or more false positive estimations is determined, where each of the one or more false positive estimations corresponds to the one or more matches. A combined score is generated based on the one or more false positive estimations.

Additional features and advantages of the subject technology will be set forth in the description below, and in part will be apparent from the description, or may be learned by practice of the subject technology. The advantages of the subject technology will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide further understanding of the subject technology and are incorporated in and constitute a part of this specification, illustrate aspects of the subject technology and together with the description serve to explain the principles of the subject technology.

DETAILED DESCRIPTION

Figure 1:
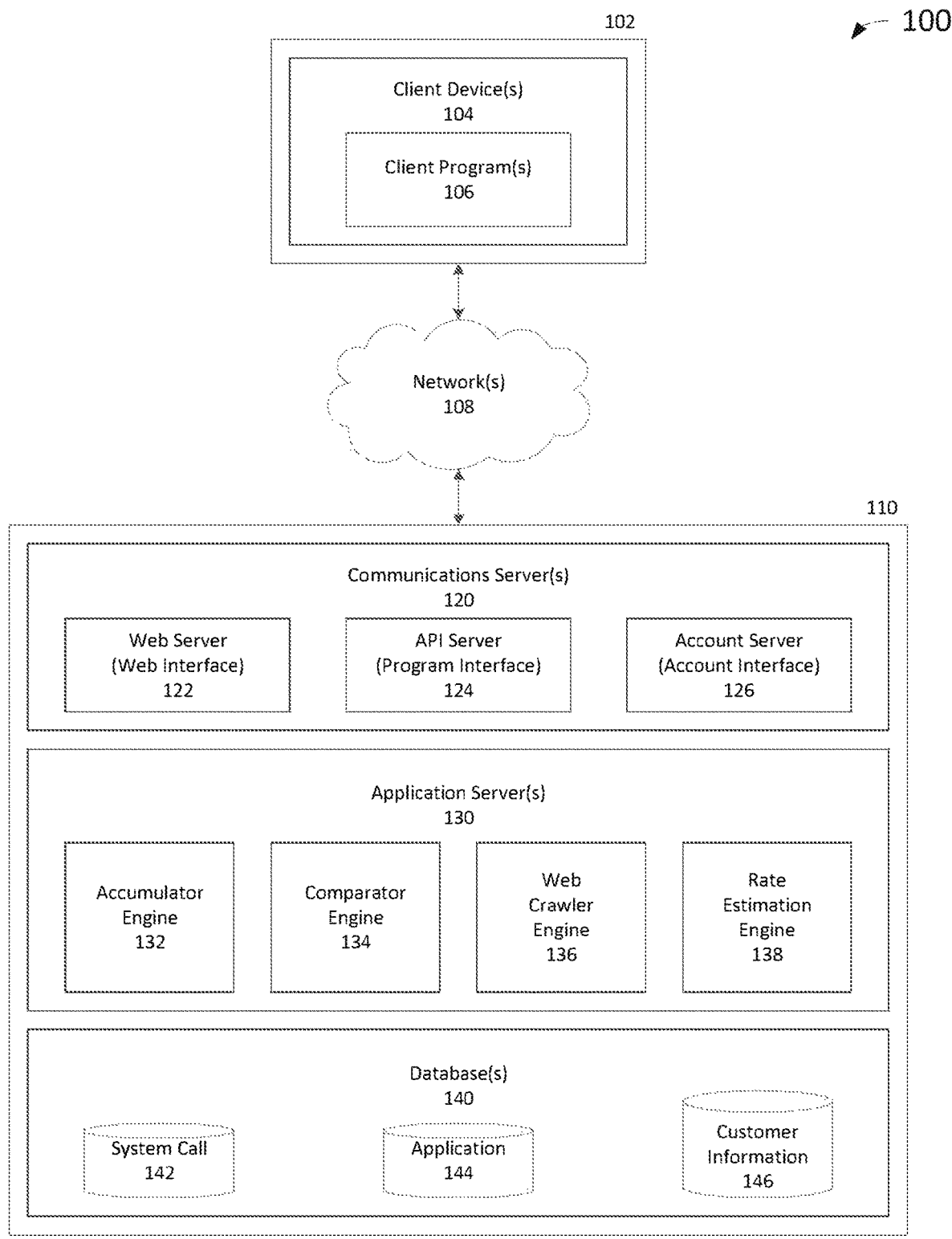
FIG. 1 is a block diagram of an exemplary computing system on which the generation of automatic false positive estimations for website matching may be performed.

In order to better understand and to better serve customers, FinTech companies that operate in online marketplaces collect and store a variety of information about their customers (i.e., merchant customers). Information such as the name, phone number(s), address(es), email address(es), etc., of a merchant customer may be stored as assets. Such information may be used to verify that specific websites belong to corresponding customers. Once matched and verified, data found on these webpages may be relied upon for tailoring products to the merchant customers' needs. Unfortunately, not all information provided by merchant customers during onboarding may be correct and/or up to date. For example, the merchant customer's URL is often improperly entered. Therefore, a there needs to be a process to determine whether webpages match corresponding merchant customers to ensure that the correct webpages are being crawled for information about the merchant customers.

In order to serve a customer base several hundred millions large, the task of understanding these merchant customers' businesses must be broken into smaller tasks that can scale. For example, to predict a merchant's growth, a company can frequently crawl the merchant's webpage and keep track of the number of items on the merchant's web catalog. In order to count the number of items in the web catalog, however, the merchant's webpage must be crawled in an efficient manner. And before a crawl can be initiated, a reliable data source mapping these customers to their webpages must be available.

One mapping approach would be to solve a supervised machine learning (ML) problem, where the vector of scores is treated as features, and sets of labeled pairs represent matches. Constructing these sets, however, is costly due to the effort required to label the cust_id, URL pairs. Labeling pairs requires a manual review of webpages and the assets of the merchant customer, and logging decisions of matches between the customer and the URL. Furthermore, when solving a supervised ML problem, the number of learning observations should be an exponential function of the number of features. As such, the amount of time required to arrive at a solution far exceeds what would be practicable for the associated business operations. For example, FinTech companies that are interested in predicting growth in a merchant's sales (in order to offer credit or loans for paying suppliers), or in predicting that a merchant is not capable of handling a certain level of operational growth (so that risk solutions can be tightened across the merchant), may only have several milliseconds to decide whether or not to extend credit to a merchant customer. Thus, supervised ML and other similar solutions will not be usable.

In order to provide a measure for correlation hidden in each cust_id, URL pair, a measurement of the accuracy of some logic that decides whether a match exists is necessary. Using a naïve approach, model results can be compared against some labeled test data set, and a false positive rate (FPR) may be measured. But since such test data sets do not exist, and as a result, ML models cannot be easily and effectively trained, an alternative method for measuring the FPR is required.

To properly match customers to the webpages, a variety of information collected from each merchant customer during onboarding and associated with a unique cust_id corresponding to the customer may be analyzed. As provided above, information such as name, phone number, address, email address, URL, etc., may be associated with the cust_id. In one example for matching a customer to a webpage, a given cust_id, URL pair is used to measure the relationship of the pair. Each piece of asset information is searched within the webpages of the associated URL. For example, searching and finding a name of a customer within a webpage of the associated URL content provides a strong signal of a relationship between that cust_id and the URL. Analyzing this information, a connection between a cust_id and a URL may be established. Once established, i.e., the webpages associated with the URL is verified as matching the cust_id, additional information of the customer may be obtained from the verified webpages for further analysis.

This specification includes references to "one embodiment," "some embodiments," or "an embodiment." The appearances of these phrases do not necessarily refer to the same embodiment. Particular features, structures, or characteristics may be combined in any suitable manner consistent with this disclosure.

"First," "Second," etc. As used herein, these terms are used as labels for nouns that they precede, and do not necessarily imply any type of ordering (e.g., spatial, temporal, logical, cardinal, etc.). Furthermore, various components may be described or claimed as "configured to" perform a task or tasks. In such contexts, "configured to" is used to connote structure by indicating that the components include structure (e.g., stored logic) that performs the task or tasks during operation. As such, the component can be said to be configured to perform the task even when the component is not currently operational (e.g., is not on). Reciting that a component is "configured to" perform one or more tasks is expressly intended not to invoke 35 U.S.C. § 112(f) for that component.

FIG. 1 is a block diagram of an exemplary computing system on which an automatic false positive estimation for website matching may be performed. As shown, a computing system 100 may comprise or implement a plurality of servers, devices, and/or software components that operate to perform various methodologies in accordance with the described embodiments. Exemplary servers, devices, and/or software components may include, for example, stand-alone and enterprise-class servers running an operating system (OS) such as a MICROSOFT® OS, a UNIX® OS, a LINUX® OS, or other suitable OS. It may be appreciated that the servers illustrated in FIG. 1 may be deployed in other ways and that the operations performed and/or the services provided by such servers may be combined, distributed, and/or separated for a given implementation and may be performed by a greater number or fewer number of servers. One or more servers may be operated and/or maintained by the same or different entities.

Computing system 100 may include, among various devices, servers, databases and other elements, one or more clients 102 comprising or employing one or more client devices 104, such as a laptop, a mobile computing device, a tablet, a personal computer, a wearable device, and/or any other computing device having computing and/or communications capabilities in accordance with the described embodiments. Client devices 104 may also include a cellular telephone, smart phone, electronic wearable device (e.g., smart watch, virtual reality headset), or other similar mobile devices that a user may carry on or about his or her person and access readily.

Client devices 104 generally may provide one or more client programs 106, such as system programs and application programs to perform various computing and/or communications operations. Exemplary system programs may include, without limitation, an operating system (e.g., MICROSOFT® OS, UNIX® OS, LINUX® OS, Symbian OS™, iOS, Android, Embedix OS, Binary Run-time Environment for Wireless (BREW) OS, JavaOS, a Wireless Application Protocol (WAP) OS, and others), device drivers, programming tools, utility programs, software libraries, application programming interfaces (APIs), and so forth. Exemplary application programs may include, without limitation, a payment system application, a web browser application, messaging application, contacts application, calendar application, electronic document application, database application, media application (e.g., music, video, television), location-based services (LBS) application (e.g., GPS, mapping, directions, positioning systems, geolocation, point-of-interest, locator) that may utilize hardware components such as an antenna, and so forth. One or more of client programs 106 may display various graphical user interfaces (GUIs) to present information to and/or receive information from one or more users of client devices 104. In some embodiments, client programs 106 may include one or more applications configured to conduct some or all of the functionalities and/or processes discussed below.

As shown, client devices 104 may be communicatively coupled via one or more networks 108 to a network-based system 110. Network-based system 110 may be structured, arranged, and/or configured to allow client 102 to establish one or more communications sessions between network-based system 110 and various client devices 104 and/or client programs 106. Accordingly, a communications session between client devices 104 and network-based system 110 may involve the unidirectional and/or bidirectional exchange of information and may occur over one or more types of networks 108 depending on the mode of communication. While the embodiment of FIG. 1 illustrates a computing system 100 deployed in a client-server operating environment, it is to be understood that other suitable operating environments and/or architectures may be used in accordance with the described embodiments.

Data communications between client devices 104 and the network-based system 110 may be sent and received over one or more networks 108 such as the Internet, a WAN, a WWAN, a WLAN, a mobile telephone network, a landline telephone network, personal area network, as well as other suitable networks. For example, client devices 104 may communicate with network-based system 110 over the Internet or other suitable WAN by sending and or receiving information via interaction with a website, e-mail, IM session, and/or video messaging session. Any of a wide variety of suitable communication types between client devices 104 and system 110 may take place, as will be readily appreciated. In particular, wireless communications of any suitable form (e.g., Bluetooth, near-field communication, etc.) may take place between client device 104 and system 110, such as that which often occurs in the case of mobile phones or other personal and/or mobile devices.

Network-based system 110 may comprise one or more communications servers 120 to provide suitable interfaces that enable communication using various modes of communication and/or via one or more networks 108. Communications servers 120 may include a web server 122, an API server 124, and/or a messaging server 126 to provide interfaces to one or more application servers 130. Application servers 130 of network-based system 110 may be structured, arranged, and/or configured to provide various online services to client devices that communicate with network-based system 110. In various embodiments, client devices 104 may communicate with application servers 130 of network-based system 110 via one or more of a web interface provided by web server 122, a programmatic interface provided by API server 124, and/or a messaging interface provided by messaging server 126. It may be appreciated that web server 122, API server 124, and messaging server 126 may be structured, arranged, and/or configured to communicate with various types of client devices 104, and/or client programs 106 and may interoperate with each other in some implementations.

Web server 122 may be arranged to communicate with web clients and/or applications such as a web browser, web browser toolbar, desktop widget, mobile widget, web-based application, web-based interpreter, virtual machine, mobile applications, and so forth. API server 124 may be arranged to communicate with various client programs 106 comprising an implementation of API for network-based system 110. Messaging server 126 may be arranged to communicate with various messaging clients and/or applications such as e-mail, IM, SMS, MMS, telephone, VoIP, video messaging, IRC, and so forth, and messaging server 126 may provide a messaging interface to enable access by client 102 to the various services and functions provided by application servers 130.

Application servers 130 of network-based system 110 may be servers that provide various services such as tools for verifying URLs based on information collected about customers. Application servers 130 may include multiple servers and/or components. For example, application servers 130 may include a customer information accumulator engine 132, comparator engine 134, web crawler 136, and/or rate estimation engine 138. These servers and/or components, which may be in addition to other servers, may be structured and arranged to identify those webpages that malicious content.

Application servers 130, in turn, may be coupled to and capable of accessing one or more databases 140 including system call database 142, application database 144, and/or customer information database 146. Databases 140 generally may store and maintain various types of information for use by application servers 130 and may comprise or be implemented by various types of computer storage devices (e.g., servers, memory) and/or database structures (e.g., relational, object-oriented, hierarchical, dimensional, network) in accordance with the described embodiments.

Figure 2:
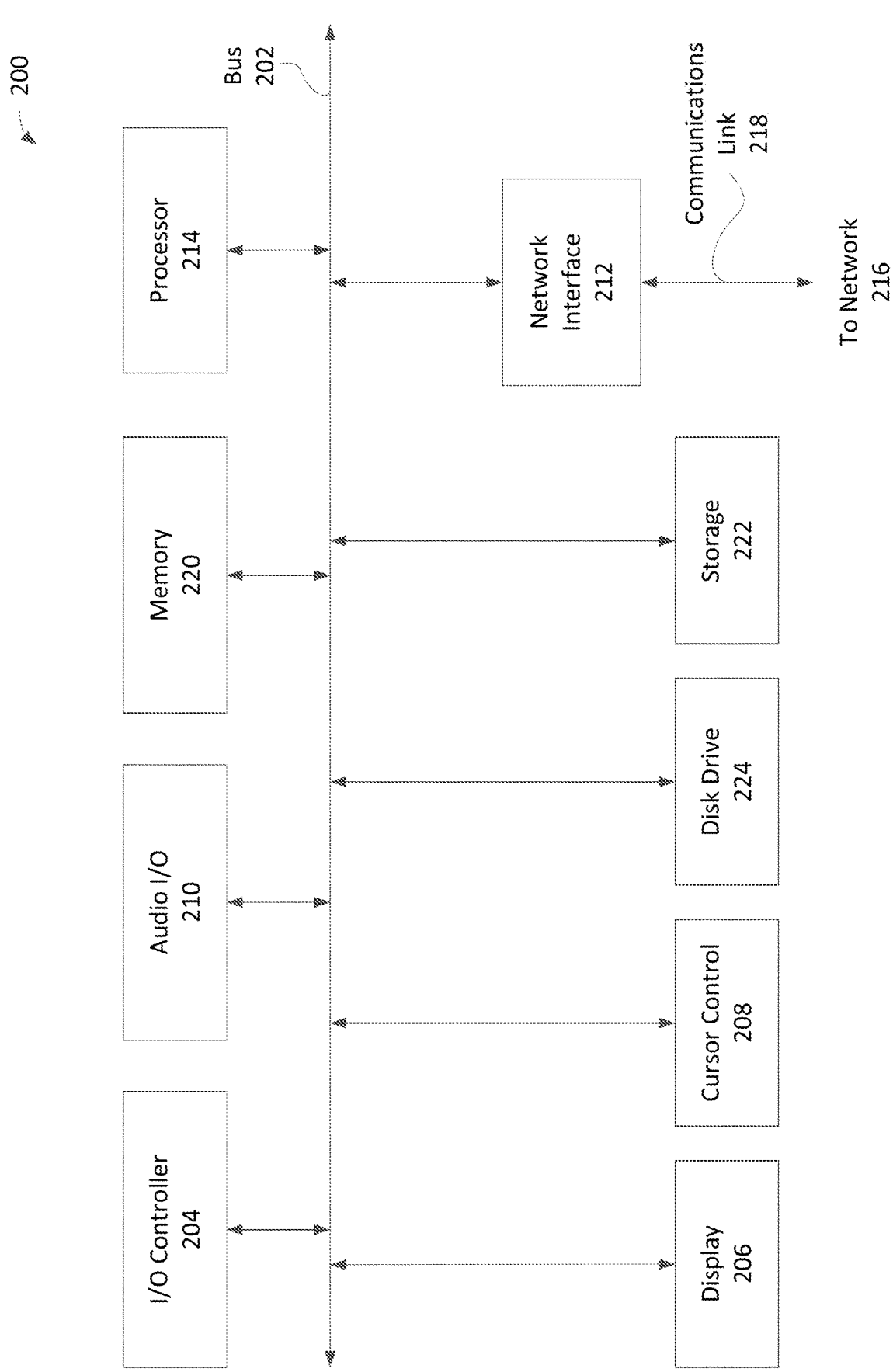
FIG. 2 is a block diagram of an exemplary computer system suitable for implementing one or more devices of the computing system in FIG. 1.

FIG. 2 illustrates an exemplary computer system 200 in block diagram format suitable for implementing on one or more devices of the computing system in FIG. 1. In various implementations, a device that includes computer system 200 may comprise a personal computing device (e.g., a smart or mobile phone, a computing tablet, a personal computer, laptop, wearable device, PDA, etc.) that is capable of communicating with a network. A service provider and/or a content provider may utilize a network computing device (e.g., a network server) capable of communicating with the network. It should be appreciated that each of the devices utilized by users, service providers, and content providers may be implemented as computer system 200 in a manner as follows. Additionally, as more and more devices become communication capable, such as smart devices using wireless communication to report, track, message, relay information and so forth, these devices may be part of computer system 200.

Computer system 200 may include a bus 202 or other communication mechanisms for communicating information data, signals, and information between various components of computer system 200. Components include an input/output (I/O) controller 204 that processes a user action, such as selecting keys from a keypad/keyboard, selecting one or more buttons, links, actuatable elements, etc., and sends a corresponding signal to bus 202. I/O controller 204 may also include an output component, such as a display 206 and a cursor control 208 (such as a keyboard, keypad, mouse, touchscreen, etc.). In some examples, I/O controller 204 may include an image sensor for capturing images and/or video, such as a complementary metal-oxide semiconductor (CMOS) image sensor, and/or the like. An audio I/O component 210 may also be included to allow a user to use voice for inputting information by converting audio signals. Audio I/O component 210 may allow the user to hear audio.

A transceiver or network interface 212 transmits and receives signals between computer system 200 and other devices, such as another user device, a merchant server, an email server, application service provider, web server, a payment provider server, and/or other servers via a network. In various embodiments, such as for many cellular telephone and other mobile device embodiments, this transmission may be wireless, although other transmission mediums and methods may also be suitable. A processor 214, which may be a micro-controller, digital signal processor (DSP), or other processing component, processes these various signals, such as for display on computer system 200 or transmission to other devices over a network 216 via a communication link 218. Again, communication link 218 may be a wireless communication in some embodiments. Processor 214 may also control transmission of information, such as cookies, IP addresses, images, and/or the like to other devices.

Components of computer system 200 also include a system memory 220 (e.g., RAM), a static storage component 222 (e.g., ROM), and/or a disk drive 224. Computer system 200 performs specific operations by processor 214 and other components by executing one or more sequences of instructions contained in system memory 220. Logic may be encoded in a computer-readable medium, which may refer to any medium that participates in providing instructions to processor 214 for execution. Such a medium may take many forms, including but not limited to, non-volatile media, volatile media, and/or transmission media. In various implementations, non-volatile media includes optical or magnetic disks, volatile media includes dynamic memory such as system memory 220, and transmission media includes coaxial cables, copper wire, and fiber optics, including wires that comprise bus 202. In one embodiment, the logic is encoded in a non-transitory machine-readable medium. In one example, transmission media may take the form of acoustic or light waves, such as those generated during radio wave, optical, and infrared data communications.

Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer is adapted to read.

In various embodiments of the present disclosure, execution of instruction sequences to practice the present disclosure may be performed by computer system 200. In various other embodiments of the present disclosure, a plurality of computer systems 200 coupled by communication link 218 to the network (e.g., such as a LAN, WLAN, PTSN, and/or various other wired or wireless networks, including telecommunications, mobile, and cellular phone networks) may perform instruction sequences to practice the present disclosure in coordination with one another. Modules described herein may be embodied in one or more computer readable media or be in communication with one or more processors to execute or process the techniques and algorithms described herein.

A computer system may transmit and receive messages, data, information and instructions, including one or more programs (i.e., application code) through a communication link and a communication interface. Received program code may be executed by a processor as received and/or stored in a disk drive component or some other non-volatile storage component for execution.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer-readable media. It is also contemplated that software identified herein may be implemented using one or more computers and/or computer systems, networked and/or otherwise. Such software may be stored and/or used at one or more locations along or throughout the system, at client 102, network-based system 110, or both. Where applicable, the ordering of various steps described herein may be changed, combined into composite steps, and/or separated into sub-steps to provide features described herein.

The foregoing networks, systems, devices, and numerous variations thereof may be used to implement one or more services, such as the services discussed above and in more detail below.

One technique that may be employed to link merchant customers to websites is to perform searches of assets across a collection of webpages, and perform a calculation based on the search results to provide an estimate on the confidence of that link. That is, given a cust_id, URL pair, the relationship in the pair may be measured by searching for the assets that have been previously collected under the cust_id in the URL. For example, finding a name or an email of a customer (represented by a particular cust_id) in the URL's webpage content provides a strong signal for a relationship between the cust_id and a URL because the underlying logic states that a match between at least one of the assets to the webpage is a strong indication for correlation in the cust_id, URL pair. One or more assets for the specific cust_id may be searched on webpages corresponding to the URL associated with the cust_id.

Consider the customer depicted in Table 1 below where each customer, as shown in the table, has an associated unique cust_id number.

TABLE 1

| Example of cust_id, URL pairs | |
|---|---|
| Cust_id | URL |
| 123456789 | www.hometheater.com |
| 534232346 | www.gardenshop.com |
| . . . | . . . |

For each cust_id, a variety of information such as email, name, business name, phone number, address, etc., of the corresponding merchant customer may be stored as assets (shown in Table 2, below). The information, which may be collected during an onboarding process, can thus be used to link specific URLs to a corresponding customer merchant.

TABLE 2 example of assets of a customer

Cust_id 123456789

| Asset Type | Value |
|---|---|
| Email | john@hometheater.com |
| First name | John |
| Last name | Doe |
| Business name | Home Theater LTD |
| Phone | +1 (212) 555-1212 |
| Address | 1654 6$^{th}$ Avenue, New York, NY, USA |

Figure 3:
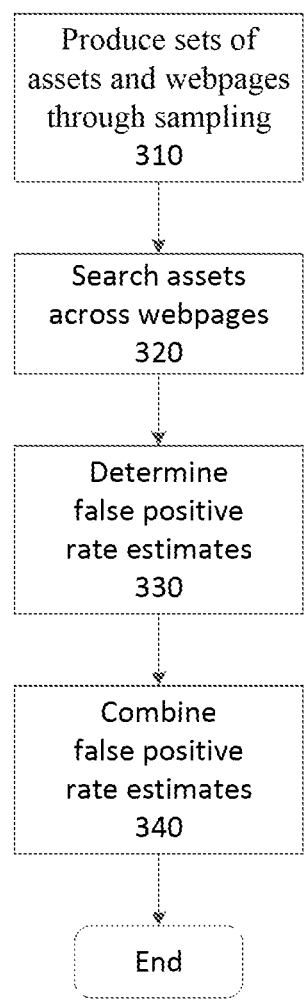
FIG. 3 illustrates an exemplary process 300 for generating automatic false positive estimations for website matching.

FIG. 3 illustrates an exemplary process 300 for performing an automatic false positive estimation for website matching. In step 310, several sets of assets and webpages are produced through a sampling process. In some embodiments, the sets of assets and webpages are produced by deduplicating customers and URLs. After deduplication, random sample may be taken. Each set of assets, as discussed above, may be collected from a unique merchant customer during an onboarding process. Once the assets and webpages are produced, a search for the assets can performed across the webpages in step 320 to determine if there are any matches. In some embodiments, email assets for each merchant customer is searched across the webpages to determine if the emails of merchant customers matches content in any of the URLs. In other embodiments, the name associated with the merchant customer may be searched. In yet other embodiments, a combination of different assets for each merchant customer can be searched.

The assumption is that an asset should appear only once in a random sample of webpages for there to be a high likelihood of correlation. That is, if a single instance of a match is found from a search across numerous webpages, it can be inferred that there's a strong correlation between the asset and the matched webpage. Conversely, if an asset matches several different webpages, then these matches may indicate a false positive. For example, multiple customers may have the same first name. In such a case, a search of a first name (e.g., David) across the aggregated webpages will return multiple matches. If an asset is found across numerous webpages, the likelihood of the asset being correlated to the matched webpages is presumed to be low because the search results suggests that the asset is not unique or may be inaccurate, and thus does not produce a trustworthy result. Table 3 below provides an example of asset match scores.

TABLE 2

Example of asset match scores.

| Email score | First name score | Last name score | Business name score | Phone score | Address score |
|---|---|---|---|---|---|
| 90 | 100 | 60 | 85 | 76 | 28 |

The logic used to produce Table 3 suggests that a match between at least one of the assets to the webpage is a strong indication for correlation hidden in the cust_id, URL pair. For example, consider the customer depicted in Table 2 and its asset score in Table 3. The asset scores reveal a strong correlation between the fir name of the customer and its webpage (e.g., a 100 score means an exact match). In addition, the email asset also resulted in a high score of 90. In this case, it indicates a Levenshtein distance of 1. In some embodiments, a score above a predefined threshold (e.g., 90) represents a match between a cust_id and its corresponding URL. The threshold maybe be set manually. Alternatively, the threshold may be calculated based on certain statistical methods.

In some embodiments, the match is performed in a fuzzy manner, as opposed to searching for an exact match. For example, a Levenshtein distance may be used to measure a match for each asset as a number between 0 to 1. For example, consider the customer from Table 2. The customer may be assigned with the URL www.hometheater.com. Thus, the system crawls www.hometheater.com to search each of the above assets in the web page content. The search for each asset may return a score between 0-100, where 100 represents an exact match (i.e., the exact asset string was found in the webpage content), and 0 represents no match at all. In this example, a score of 90 for the email asset represents a match to the email string john@hometheatre.co.uk that was found on the webpage. As can be observed, the match isn't exact since the spelling of "theater" is different from "theatre," and the URL extensions are different. However, calculating the match as a Levenshtein distance compensates for this minor discrepancy and thus improves accuracy.

To illustrate the process of calculating an automatic false positive estimation, an example set of 20,000 cust_id, URL pairs is considered. As discussed in referenced to step 310 above, the set is sampled such that each customer and each URL appears just once. The process then searches the email assets associated with the 20,000 cust_ids across the 20,000 URL pages as shown in step 320, and returns counts for the different number of times an email appears across the URL pages. Table 4 below depicts the match results.

TABLE 4

False positive rate estimation of email asset.
Total Count: 7483

| Count | Hits | Total Ratio |
|---|---|---|
| 7474 | 1 | 99.9 |
| 8 | 2 | 0.1 |
| 1 | 5 | 0 |

The total number of emails for which at least one match in found within the 20,000 webpages is 7483, as indicated in Table 4. That is, 7483 out of the 20,000 emails were found in at least one of the 20,000 webpages. Of those 7483 hits, 7474 hits correspond to emails that were found only once among the 20,000 webpages (i.e., there were 7474 counts from emails had only one hit among the 20,000 webpages). Additionally, eight emails were found in two different webpages, and one email was found across five different webpages. The counts are subsequently used to determine a false positive rate estimation in step 330. To calculate the false positive rate estimation, the total ratio of "one hit" emails (i.e., count of single hits divided by total count) is subtracted from 1, thus giving us 1−(7474/7483)=0.001.

In another example, business name assets may be searched within the URL pages. Using the same set of 20,000 cust_id, URL pairs as described in the example above, business names associated to each of the 20,000 cust_ids are considered in this example. Searching each of the 20,000 business names in each and every URL webpage produce the results shown in Table 5 below, which depicts the top 10 results. In most instances, not all results are required to calculate the false positive rate estimation.

In this example, the total number of business name hits across the 20,000 webpages is 18,535. Of the 18,535 hits, 15,000 business names matched with exactly one URL page. The remainder of the business names, as shown in Table 5, matched more than one URL page. For example, 967 business names matched two webpages, 417 business names matched 3 webpages, and so on. By the same calculation used above, the false positive rate of the business name asset is estimated at 1−0.81=0.19.

TABLE 5

False positive rate estimation of business name asset
Total Count: 18,535

| Count | Hits | Total Ratio |
|---|---|---|
| 15,000 | 1 | 80.9 |
| 967 | 2 | 5.2 |
| 417 | 3 | 2.2 |
| 230 | 4 | 1.2 |
| 163 | 5 | 0.9 |
| 128 | 6 | 0.7 |
| 80 | 9 | 0.4 |
| 80 | 7 | 0.4 |
| 76 | 8 | 0.4 |
| 50 | 12 | 0.3 |

The probability measure (i.e., the false positive rate estimation) for each asset match may be used to determine an overall probability that a customer associated with the set of assets matches a URL. Since data is generally noisy, there may be some false positive where the logic suggests a correlation that does not actually exist. In other words, the logic may not be completely accurate. For example, consider the name asset where multiple customers may have a same common name, e.g., David. In such an instance, the probability of finding a match between the name asset of the customer and the webpage content of the URLs would be high even though an actual match between the asset and the URL does not exist. Consequently, a probability measure (i.e., FPR estimation) for matches in each asset category we find is determine and subsequently used to provide a combined confidence measure.

As discussed above, each match may be assigned a value that's equivalent to the FPR of that match subtracted from 1. For example, if we knew the FPR of the name asset is 0.030, we could assign pairs matched only on name with a confidence value of 1−0.300=0.700. Similarly, if the FPR of the email asset is 0.001, pairs matched on emails are assigned with a confidence value of 1−0.001=0.999. In practice, several asset scores may be generated for each pair. For example, matches for both name and email assets may be found. To improve accuracy in the final correlation results (i.e., the correlation between the cust_id, URL pair), the confidence scores may be combined in step 340. In an exemplary embodiment, the combining may be performed based on Equation 1, as shown here:

$$1 - \prod_{i=1}^{n} FPR_i^{I_i} \quad \text{Equation 1}$$

In this equation, $FPR_i$ is the FPR calculated for the $i^{th}$ asset match, and $I_i$ is an indicator variable having a value of 1 in the case where the asset i matches, and a value of 0 otherwise. In other words, if no match for an asset was found within the webpages, then that asset should not be taken into consideration in the calculation of the final correlation result. As the number of asset matches increase, the confidence in the combined final correlation result also increases. That is to say, when more matches occur, the confidence in the resulting correlation estimation grows.

In order to evaluate the false positive rate of an asset, a large amount of asset values from each asset (several tens of thousands) is sampled to try to match it to a corresponding number of web pages. A single match is expected since the cust_id, URL pairs are sampled. For each customer asset, a match is run across all URL webpage content.

For example, consider an example of two pairs: cust_id$_a$, URL$_1$ and cust_id$_b$, URL$_2$. Assume cust_id$_a$ has the set of assets depicted in Table 2, and cust_id$_b$ has some other set of assets. The assets from cust_id$_a$ are matched across each and every webpage content to see if any matches occur. Whenever there is a single match, the match is counted as a true positive. Conversely, a match with two or more webpages suggests a false positive. In some embodiments, the overall estimation of the false positive rate of a given asset is calculated as the number of matches of an asset across at least two pages divided by the number of total asset values with any match.

As described above, one manner in which the combined FPR estimate can be used is to make a determination, with some level of confidence, whether a URL belongs to a merchant customer. Once a determination is made that the URL does belong to a merchant customer, the information from that merchant customer's website can be crawled to obtain further context about the merchant customer. The additional context may improve the way in which the merchant customer is served. For example, the information from the webpages of the merchant may be used to predict significant growth in sales, and thus an offer of credit or loans may be made by the FinTech company on the fly. Furthermore, having an understanding of the vertical in which the merchant operates enhances the assessment of risks so that specific payment solutions may be offered.

In some instances, contract violations may be detected based on the information gathered from the webpages that have been crawled. For example, merchants are offered better commission terms in return for banners on their webpages; however, determining that the merchant no longer displays the banner would result in the revocation of the preferential terms.

Bad customer experiences may be further determined based on the crawled information. FinTech companies may have guidelines on how and where a merchant customer places checkout buttons on the merchant customer's pages. By knowing the webpage of a customer, assistance on improving the checkout flow may be provided.

Figure 4:
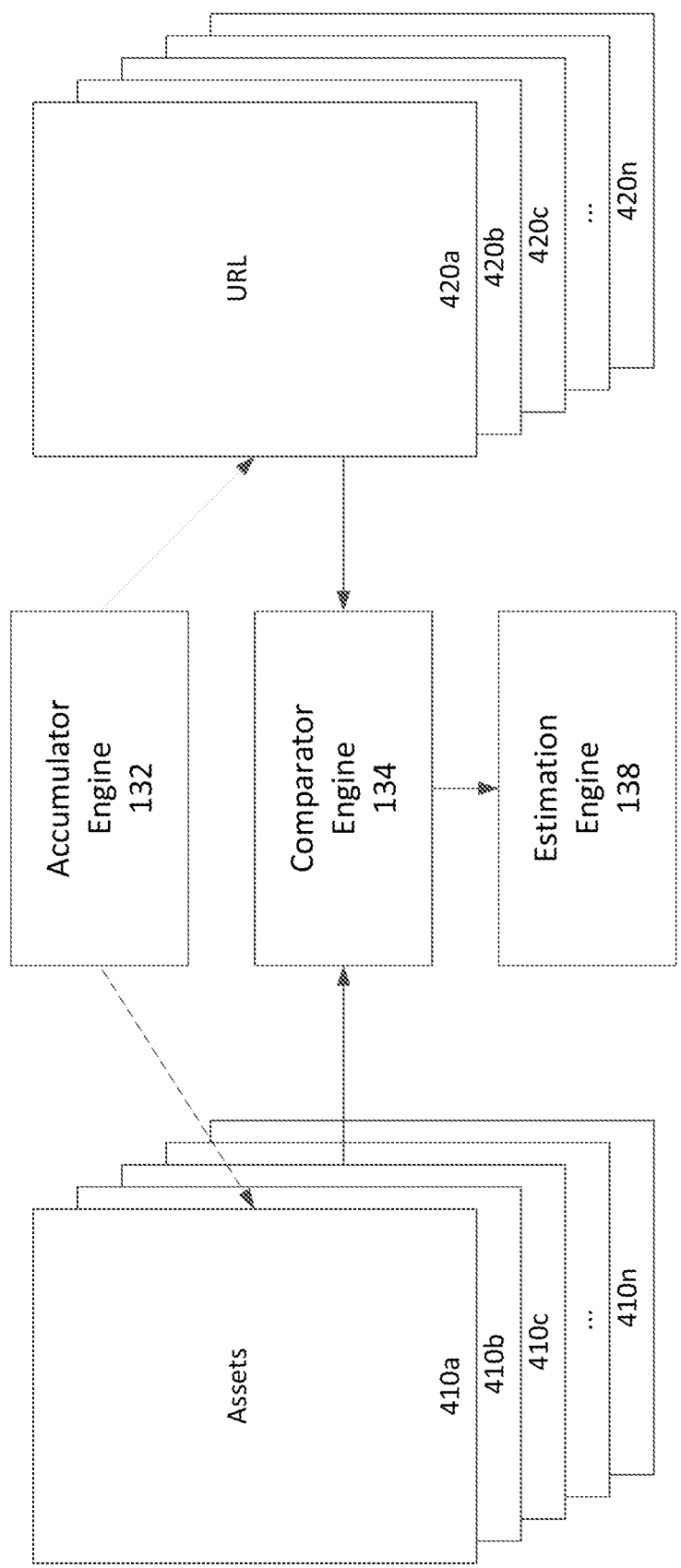
FIG. 4 provides a schematic representation of the automatic false positive estimation generation within a network of computing components.

FIG. 4 provides an illustrative depiction of the FPR estimation process. The sets of assets 410a-410n (each set corresponding to a merchant customer represented by a unique cust_id) are compiled for matching to the set of URLs 420a-420n by accumulator engine 132. Comparator engine 134 searches each value from each set of assets across the URLs. Estimation engine 138 calculates the FPR value for each of the matches, and then combines the confidence scores based on a formula such as the one depicted in Equation 1 above. When a URL is linked to a merchant customer with a confidence higher than a predetermined threshold, then the URL is confirmed as belonging to the merchant customer. Once confirmed, the specific URL may be crawled for information to provide additional context on the merchant customer which may be leveraged to make business decisions regarding the merchant customer.

The user device (i.e., the computing device) described above may be one of a variety of devices including but not limited to a smartphone, a tablet, a laptop and a pair of augmented reality spectacles. Each of these devices embodies some processing capabilities and an ability to connect to a network (e.g., the internet, a LAN, a WAN, etc.). Each device also includes a display element for displaying a variety of information. The combination of these features (display element, processing capabilities and connectivity) on the mobile communications enables a user to perform a variety of essential and useful functions.

The foregoing description is provided to enable a person skilled in the art to practice the various configurations described herein. While the subject technology has been particularly described with reference to the various figures and configurations, it should be understood that these are for illustration purposes only and should not be taken as limiting the scope of the subject technology.

There may be many other ways to implement the subject technology. Various functions and elements described herein may be partitioned differently from those shown without departing from the scope of the subject technology. Various modifications to these configurations will be readily apparent to those skilled in the art, and generic principles defined herein may be applied to other configurations. Thus, many changes and modifications may be made to the subject technology, by one having ordinary skill in the art, without departing from the scope of the subject technology.

It is understood that the specific order or hierarchy of steps in the processes disclosed is an illustration of exemplary approaches. Based upon design preferences, it is understood that the specific order or hierarchy of steps in the processes may be rearranged. Some of the steps may be performed simultaneously. The accompanying method claims present elements of the various steps in a sample order, and are not meant to be limited to the specific order or hierarchy presented.

A phrase such as "an aspect" does not imply that such aspect is essential to the subject technology or that such aspect applies to all configurations of the subject technology. A disclosure relating to an aspect may apply to all configurations, or one or more configurations. An aspect may provide one or more examples of the disclosure. A phrase such as an "aspect" may refer to one or more aspects and vice versa. A phrase such as an "implementation" does not imply that such implementation is essential to the subject technology or that such implementation applies to all configurations of the subject technology. A disclosure relating to an implementation may apply to all implementations, or one or more implementations. An implementation may provide one or more examples of the disclosure. A phrase such an "implementation" may refer to one or more implementations and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples of the disclosure. A phrase such as a "configuration" may refer to one or more configurations and vice versa.

Furthermore, to the extent that the terms "include," "have," and "the like" are used in the description or the claims, such terms are intended to be inclusive in a manner similar to the term "comprise" as "comprise" is interpreted when employed as a transitional word in a claim.

The word "exemplary" is used herein to mean "serving as an example, instance, or illustration." Any implementation described herein as "exemplary" is not necessarily to be construed as preferred or advantageous over other implementations.

A reference to an element in the singular is not intended to mean "one and only one" unless specifically stated, but rather "one or more." The term "some" refers to one or more. All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

What is claimed is:

1. A system for performing an automatic false positive estimation for website matching comprising:
   a non-transitory memory storing instructions; and
   one or more hardware processors coupled to the non-transitory memory and configured to read the instructions from the non-transitory memory to cause the system to perform operations comprising:
   aggregating a plurality of sets of assets and a plurality of uniform resource locators (URLs), wherein each set of assets and each URL are associated and correspond to one of a plurality of customer identifiers;
   for each asset:
     searching across webpage content corresponding to each of the plurality of URLs for one or more matches between the asset and the webpage content; and
     calculating a false positive estimation based on a ratio of a number of times that the asset matched to webpage content of one URL to a number of times that the asset matched to webpage content of two or more URLs and subtracting the ratio from one;
   for each set of assets:
     generating a combined score based on the false positive estimations calculated for each asset in the set, wherein the combined score comprises a confidence score that an associated URL belongs to the corresponding customer identifier; and
     determining at least one URL with a corresponding generated combined score exceeding a predetermined threshold, the at least one URL belonging to one of the plurality of customer identifiers; and
   crawling webpages corresponding to the at least one URL to extract information associated with the one of the plurality of customer identifiers.

2. The system of claim 1, wherein each set of the plurality of sets of assets comprises at least one of a name, a phone number, an address, or an email address.

3. The system of claim 1, wherein the one or more matches are determined in a fuzzy manner.

4. The system of claim 3, wherein a Levenshtein distance is used to determine the one or more matches in the fuzzy manner.

5. The system of claim 1, wherein the false positive estimation is based on a top n results of the search across webpage content.

6. The system of claim 1, wherein the combined score is based on a top n results of the search across webpage content.

7. A method for performing an automatic false positive estimation for website matching comprising:

aggregating a plurality of sets of assets and a plurality of uniform resource locators (URLs), wherein each set of assets and each URL are associated and correspond to one of a plurality of customer identifiers;

for each asset:
  searching across webpage content corresponding to each of the plurality of URLs for one or more matches between the asset and the webpage content; and
  calculating a false positive estimation by determining a ratio of a number of times that the asset matched to webpage content of one URL in relation to a number of times that the asset matched to webpage content of two or more URLs and subtracting the ratio from one;

for each set of assets:
  generating a combined score based on the false positive estimations calculated for each asset in the set, wherein the combined score comprises a confidence score that an associated URL belongs to the corresponding customer identifier; and
  determining at least one associated URL with a corresponding combined score exceeding a predetermined threshold, the at least one URL belonging to one of the plurality of customer identifiers; and
  crawling webpages corresponding to the at least one URL to extract information associated with the one of the plurality of customer identifiers.

8. The method of claim 7, wherein each set of the plurality of sets of assets comprises at least one of a name, a phone number, an address, or an email address.

9. The method of claim 7, wherein the one or more matches are determined in a fuzzy manner.

10. The method of claim 9, wherein a Levenshtein distance is used to determine the one or more matches in the fuzzy manner.

11. A non-transitory machine-readable medium having stored thereon machine-readable instructions executable to cause performance of operations comprising:
  aggregating a plurality of sets of assets and a plurality of uniform resource locators (URLs), wherein each set of assets and each URL are associated and correspond to one of a plurality of customer identifiers;
  for each asset:
    searching across webpage content corresponding to each of the plurality of URLs for one or more matches between the asset and the webpage content; and
    calculating a false positive estimation based on a ratio of a number of times that the asset matched to webpage content of one URL to a number of times that the asset matched to webpage content of two or more URLs, and subtracting the ratio from one;
  for each set of assets, determining at least one URL with a corresponding generated combined score exceeding a predetermined threshold, the at least one URL belonging to one of the plurality of customer identifiers; and
  crawling webpages corresponding to the at least one URL to extract information associated with the one of the plurality of customer identifiers.

12. The non-transitory machine-readable medium of claim 11, wherein each set of the plurality of sets of assets comprises at least one of a name, a phone number, an address, or an email address.

13. The non-transitory machine-readable medium of claim 11, wherein the one or more matches are determined in a fuzzy manner, and wherein a Levenshtein distance is used to determine the one or more matches in the fuzzy manner.

* * * * *